United States Patent
Katakam et al.

(10) Patent No.: US 11,113,035 B2
(45) Date of Patent: Sep. 7, 2021

(54) METHOD AND SYSTEM FOR IMPLEMENTING APPLICATION LINEAGE METADATA AND REGISTRATION

(71) Applicant: JPMorgan Chase Bank, N.A., New York, NY (US)

(72) Inventors: Satish Raj Katakam, Exton, PA (US); Trevor Newell, Newark, DE (US); Joe Vieira, Wilmington, DE (US); Olutayo Ibikunle, Upper Montclair, NJ (US); Tracy M. Pletz, Wilmington, DE (US); Shawn Reynolds, Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 16/695,359

(22) Filed: Nov. 26, 2019

(65) Prior Publication Data
US 2020/0272428 A1    Aug. 27, 2020

Related U.S. Application Data

(60) Provisional application No. 62/810,513, filed on Feb. 26, 2019.

(51) Int. Cl.
  *G06F 8/71* (2018.01)
  *G06F 8/33* (2018.01)
  *G06F 9/54* (2006.01)

(52) U.S. Cl.
  CPC . *G06F 8/33* (2013.01); *G06F 9/54* (2013.01)

(58) Field of Classification Search
  CPC ..... G06F 8/33; G06F 9/54; G06F 8/71; G06F 8/73; G06F 9/547; G06F 9/542
  See application file for complete search history.

(56) References Cited

U.S. PATENT DOCUMENTS

| | | | |
|---|---|---|---|
| 7,370,315 B1 * | 5/2008 | Lovell | G06F 8/33 715/763 |
| 9,542,662 B2 | 1/2017 | Roesch et al. | |
| 2015/0012315 A1 * | 1/2015 | Mohammad | G06F 21/00 705/7.11 |
| 2015/0356094 A1 * | 12/2015 | Gorelik | G06F 16/211 707/748 |
| 2017/0003948 A1 * | 1/2017 | Iyer | H04L 43/045 |
| 2018/0248701 A1 * | 8/2018 | Johnson | H04L 9/3236 |

OTHER PUBLICATIONS

Notification of Transmittal of the International Search Report and the Written Opinion of the International Searching in PCT/US20/1975 dated May 11, 2020.

* cited by examiner

*Primary Examiner* — Daxin Wu
(74) *Attorney, Agent, or Firm* — Hunton Andrews Kurth LLP

(57) ABSTRACT

The invention relates to a system that implements application lineage metadata and registration. An embodiment of the present invention is directed to auto generating Application Lineage data. This may be accomplished by implementing code markers, such as @Annotations, within the code. An embodiment of the present invention may scan the code each time a build is kicked off by a continuous integration and continuous delivery (CI/CD) pipeline. At the end of the build, the documentation may be automatically generated with application lineage information.

20 Claims, 4 Drawing Sheets

METHOD AND SYSTEM FOR IMPLEMENTING APPLICATION LINEAGE METADATA AND REGISTRATION

CROSS REFERENCE TO RELATED APPLICATIONS

The application claims priority to U.S. Provisional Application 62/810,513, filed Feb. 26, 2019, the contents of which are incorporated herein in its entirety.

FIELD OF THE INVENTION

The invention relates generally to a method and system for implementing application lineage metadata and registration.

BACKGROUND OF THE INVENTION

As technology evolves, so does the application landscape across the hybrid cloud—it gets larger and changes significantly in composition. Breaking down huge monolithic systems into discrete application components is doing "one thing well" and a key characteristic of modern day software engineering architecture. Moving away from highly coupled, low cohesion to low coupled, high cohesion components is the foundational architecture building blocks of autonomous systems. Application Program Interfaces (APIs) and Events become the primary interaction mechanism for the autonomous components to exchange data. Given the anticipated growth in autonomous services, private data, APIs and Events and their relationship to one another, manual portfolio management and governance processes will be unsustainable.

Technology organizations are constantly developing new applications and modifying existing applications that lead to building and/or modifying APIs, events, data stores as well as new integration patterns. However, there is no easy way to register all of the application metadata to understand Application Lineage. Conventional tools, at most, provide the capability to register each of the component level metadata but fail to provide a view into dependencies. Most conventional tools require someone to manually maintain the registration metadata that becomes out of date immediately. These traditional solutions further require software engineers to spend extra time to make sure the registration tools are up to date. Moreover, there is a big push back on spending any time and effort that deliver business value as this takes software engineers away from coding. At the same time, the metadata is an important part of Governance structure for all of the technology assets that an entity owns.

These and other drawbacks currently exist.

SUMMARY OF THE INVENTION

According to one embodiment, the invention relates to a system for implementing application lineage metadata and registration. The system comprises: a memory component that stores and manages code; an interactive interface that communicates with a user via a communication network; and a computer processor coupled to the memory component and the interactive interface and further configured to perform the steps of: initiating a build process for code; scanning the code for one or more annotation markers; identifying a corresponding content for each annotation marker; automatically generating registry information that identifies application lineage data associated with one or more assets or services of an ecosystem; maintaining and storing the registry information in the memory component; generating analytics based on the registry information; and providing, via the interactive interface, visualization data that graphically depicts the application lineage data.

According to another embodiment, the invention relates to a method for implementing application lineage metadata and registration. The method comprises the steps of: initiating, via a computer processor, a build process for code; scanning, via the computer processor, the code for one or more annotation markers; identifying, via the computer processor, a corresponding content for each annotation marker; automatically, via the computer processor, generating registry information that identifies application lineage data associated with one or more assets or services of an ecosystem; maintaining and storing, via the computer processor, the registry information in memory component; generating, via the computer processor, analytics based on the registry information; and providing, via an interactive interface, visualization data that graphically depicts the application lineage data.

A method of an embodiment of the present invention may be conducted on a specially programmed computer system comprising one or more computer processors, mobile devices, electronic storage devices, and networks.

The computer implemented system, method and medium described herein can provide the advantages of improved application lineage metadata registration. The various embodiments of the present invention may achieve benefits and advantages for software programmers, developers and managers. An embodiment of the present invention efficiently and accurately registers application metadata to maintain and preserve application lineage. With an embodiment of the present invention, software engineers may code by adding a marker. An embodiment of the present invention may be executed as a line of code in a manner that simplifies implementation by various users, including software engineers. According to an exemplary application, an embodiment of the present invention may be executed for various applications and frameworks. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
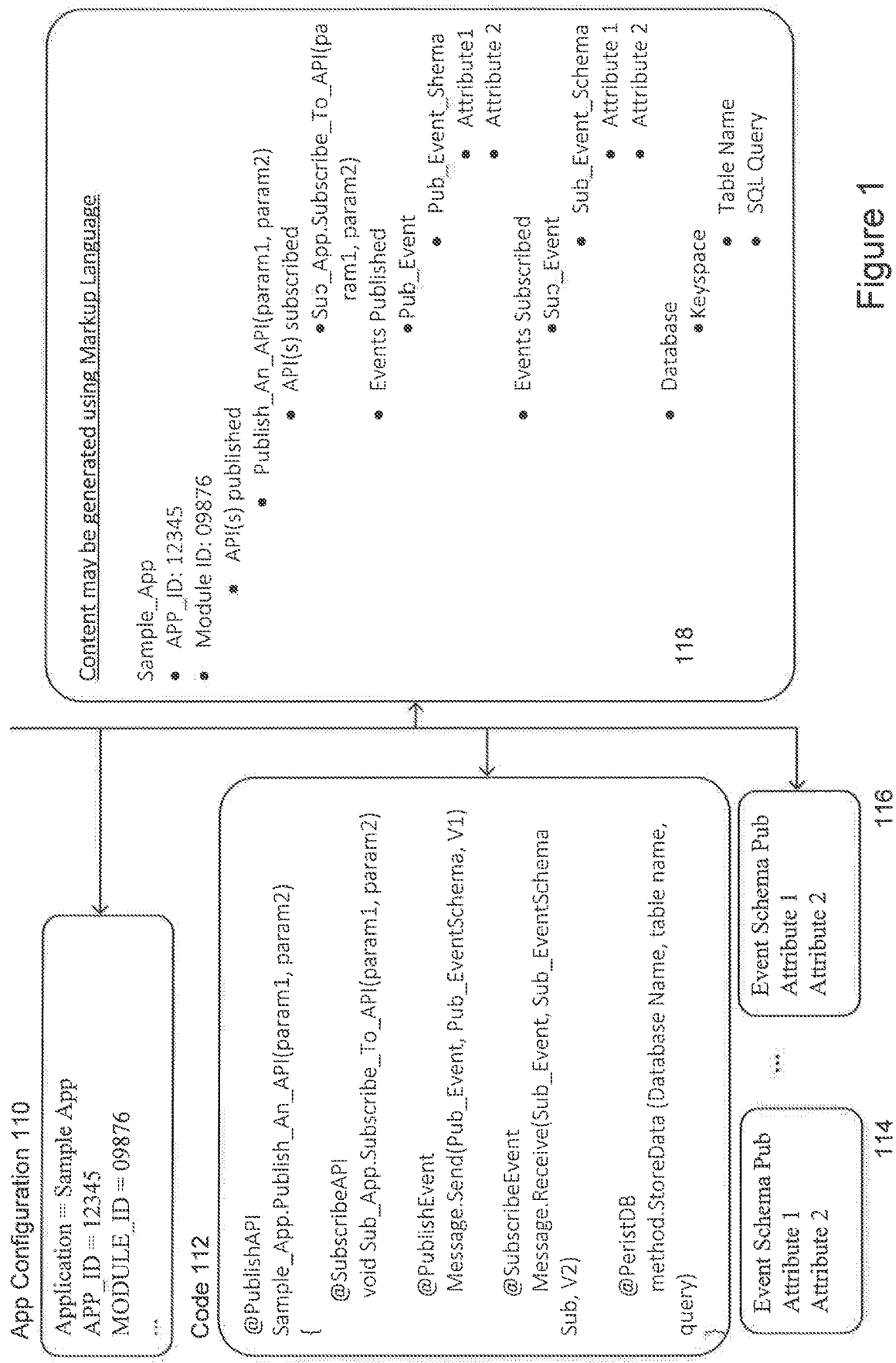
FIG. 1 is an exemplary system diagram for implementing application lineage metadata and registration, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to building in Governance to the software delivery and deployment process and tooling for visibility, understanding and control at scale. This automated governance fabric may be declarative and further built into the code to inform, at build time, how these systems components interact and/or relate with each other (e.g., traceability) and declare what contextual data is being exchanged. The dependencies/traceability representation may be subsequently connected across the application landscape, including annotations to business and technical taxonomies, to give a true sense of the executing portfolio.

A Deployment Tollgate may also be leveraged to hold code that does not properly declare itself. The Deployment Tollgate may prevent an automated deployment from occurring without the appropriate markers. For example, an embodiment of the present invention may involve: adding dependencies into a project; configuring a plug-in (e.g., Maven Plugin); and adding code markers (e.g., @PublishAPI, @SubscribeAPI, @PublishEvent, @SubscribeEvent, @PersistDB, @ApplicationID, @ComponentID, @DataRepository, @AutonomousApp (one-time), etc.). Maven may represent a core engine which provides basic project-processing capabilities and build-process management and a host of plugins which may be used to execute the actual build tasks. Other plugins may be implemented in accordance with the various embodiments of the present invention.

An embodiment of the present invention is directed to auto-generating Application Lineage data. This may be accomplished by implementing code markers, such as @Annotations, within the code. An embodiment of the present invention may scan the code each time a build is kicked off by a continuous integration and continuous delivery (CI/CD) pipeline. At the end of the build, the documentation may be automatically generated with application lineage information. The document may be generated using a "markup language" so rendering may be done easily via any browser, document editor and/or interface. An embodiment of the present invention may be based on a plugin, such as a Maven Plugin. The plugin may be integrated into a build process. A user, e.g., a Software Engineer, may code by adding code markers, such as @NewAnnotations. The plug-in may also auto-register metadata information into various tools (e.g., API, Events, etc.). An embodiment of the present invention may be executed as a line of code in a manner that simplifies implementation by Software Engineers. According to an exemplary application, an embodiment of the present invention may be executed for Java Applications based on Spring framework, for example. Other applications and frameworks may be implemented.

FIG. 1 is an exemplary system diagram for implementing application lineage metadata and registration, according to an embodiment of the present invention. As illustrated in FIG. 1, a document may be updated each time the build is run. An embodiment of the present invention may leverage a combination of annotations (e.g., Java annotations) and Application configuration files to generate the documentation. An embodiment of the present invention may further support auto-registration of APIs as well as events and metadata to a corresponding registry or registries. An embodiment of the present invention may further integrate with software development frameworks. Other frameworks may be supported.

As shown in FIG. 1, App Configuration may be represented by 110 and code may be represented by 112. As shown in Code 112, markers may be part of the code itself. Event Schema may be represented at 114 and 116. An embodiment of the present invention may generate a registry at 118. Registry 118 may include a catalog that comprises asset inventory and metadata.

Figure 2:
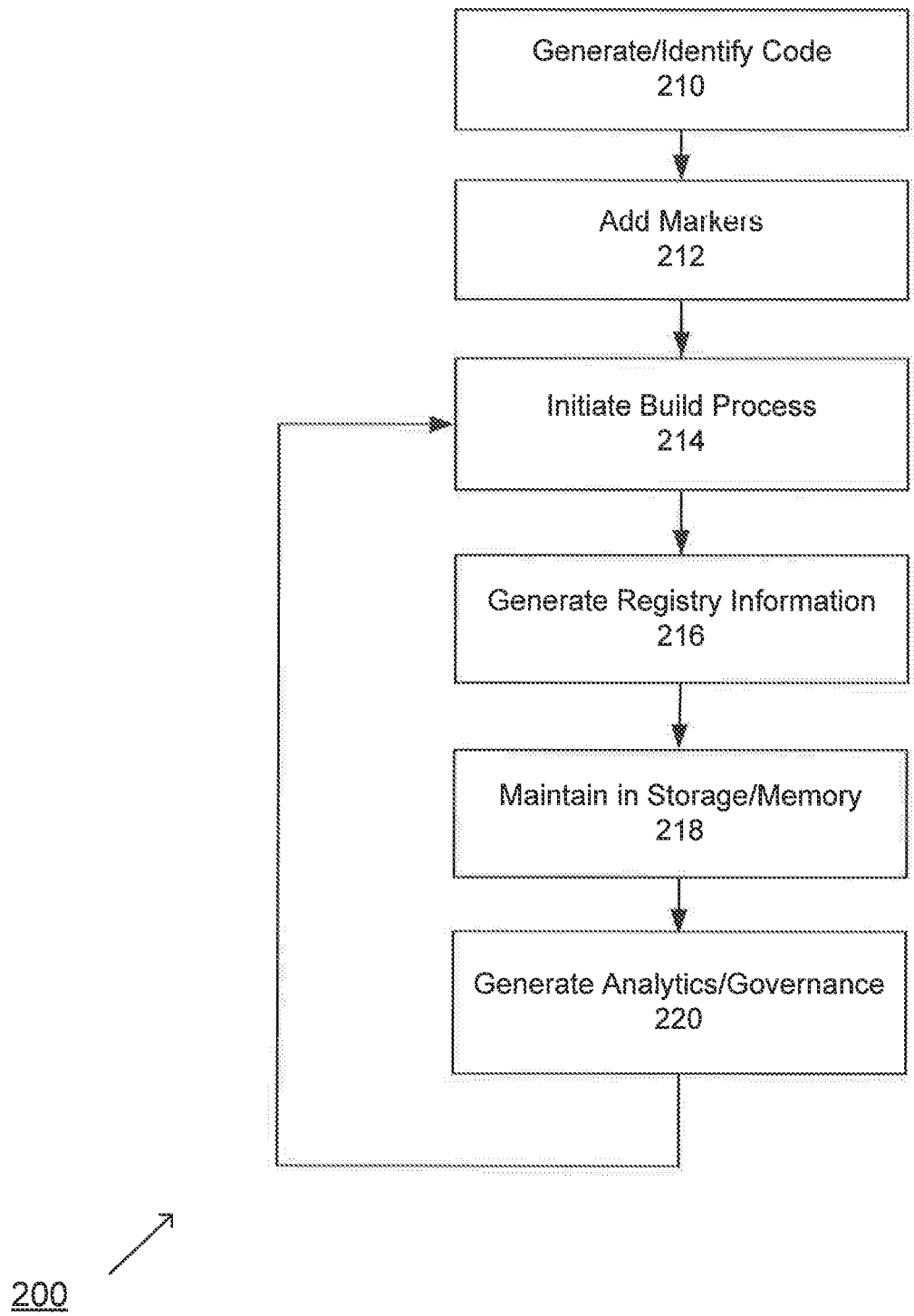
FIG. 2 is an exemplary flow illustrating an application lineage metadata and registration, according to an embodiment of the present invention.

FIG. 2 is an exemplary flow illustrating an application lineage metadata and registration, according to an embodiment of the present invention. At step 210, code may be generated and/or otherwise identified. At step 212, markers may be added to the code. At step 214, a build process may be initiated. At step 216, registry information may be automatically generated. At step 218, the system may maintain and/or manage in a storage or memory component. At step 220, the system may generate and apply analytics and manage governance. The process may feedback to code generation at step 210. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Each step is described in detail below.

At step 210, code may be generated and/or otherwise identified. Any programming language may be used, e.g., Java, Python, etc.

At step 212, markers may be added to the code. For example, a set of predefined markers (e.g., @PublishAPI, @SubscribeAPI, @AppIdentifier, @ModuleIdentifier, @PublishEvent, @SubscribeEvent etc.) may be added to the code.

At step 214, a build process may be initiated. The pre-build and build process may use custom plugins that integrate with the IDE or build tool. The build process may use Maven with a custom plug-in. Maven is an example of a build tool that is specific for Java applications. The build tool plugins add additional behavior and functionality during the build process. An embodiment of the present invention may scan the code for markers, which may be identified as code markers (e.g., @Annotations in Java). Other symbols and/or indicators may be used. The system may identify content for each marker.

At step 216, registry information may be automatically generated. This may be in the form of a catalog. For example, a set of logical and physical (run time) catalogs may capture asset inventory and metadata, enabling a transparent portfolio with a rich search API, filter, ownership and traceability. Catalog maintenance and accountabilities may be built into software delivery and production engineering with governance rules and telemetry ensuring compliance. For example, metadata may be auto-generated to tools, such as an API and Event Registry Tools.

At step 218, the system may maintain and/or manage in a storage or memory component. For example, an Application Lineage interface or document may be auto-generated and versioned each time the code is built.

At step 220, the system may generate and apply analytics and manage governance. Taxonomies, reference data and catalog governance may be realized. The process may feedback to code generation at step 210. Step 220 may also include visualizing the analytics and governance through an interactive user interface. For example, the interactive user interface may enable a user to interact with a specific API and provide a visualization page for the API fields. The interactive user interface may also illustrate connections and/or relationship data between published and subscribed APIs.

An embodiment of the present invention is directed to a discoverability feature that identifies implementation patterns and automatically discovers an application and features without a marker or annotation in certain scenarios. For example, software engineers may develop services and/or applications following implementation patterns based on libraries, framework and/or other tools that are common and/or shared with a group or community of developers. For example, an API may have a standard format that may be based on a template or predetermined standard. Other examples may include common frameworks, templates, patterns, etc. An embodiment of the present invention may identify implementation patterns, instead of or in addition to identifying annotations or other markers. An embodiment of the present invention may include a discoverability feature that identifies and/or detects developer patterns as well as identify basic/generic markers.

An embodiment of the present invention recognizes that a governance ecosystem may be considered successful if the assets created by software engineers (code) and infrastructure engineers (infrastructure as code) serve as important inputs to enable visibility, understanding and control, at scale. This may include the following assets inclusive of the linkage across these assets: Application assets (e.g., both autonomous and monolith); Event assets (e.g., publish and subscribe, etc.); API assets (e.g., publish and invoke); and Data assets (e.g., database and schema (keyspace, table, etc.)). With an embodiment of the present invention, assets that were previously invisible are now visible, linked and proactively announced (declarative) by code.

With the various embodiments of the present invention, code may be scanned at build-time; for correct definition and linkage/traceability of these assets. In addition, the run-time versions of this code may be available to be examined for correct definition, inventory and linkage though telemetry. Production Product and Services may use templates that consistently describe, tag and/or link to these assets. Asset Catalogs (e.g., inventory) may be updated and evergreen as an end condition of a deployment, Governance may be relevant for a hybrid cloud environment, e.g., comprehensive, observable and linked.

An embodiment of the present invention may be directed to an intelligent feedback loop for "trust but verify." For example, an entity or firm may have standards, best practices and guidelines on how to build a software component or application. Software engineers may be encouraged to follow the guidelines where governance may be applied to ensure the guidelines are implemented as intended and further identify opportunities to improve. This may be informed by rich telemetry that may be processed by a policy/rules engine and/or pattern algorithms in pre (build) and post (run) deploy to detect non-compliance, anomalies and/or sprawl. An embodiment of the present invention may be further directed to embracing engineering practices and technology innovations across software delivery, software and infrastructure production and Site Reliability Engineering (SRE) so the governance fabric may be built-in.

Figure 3:
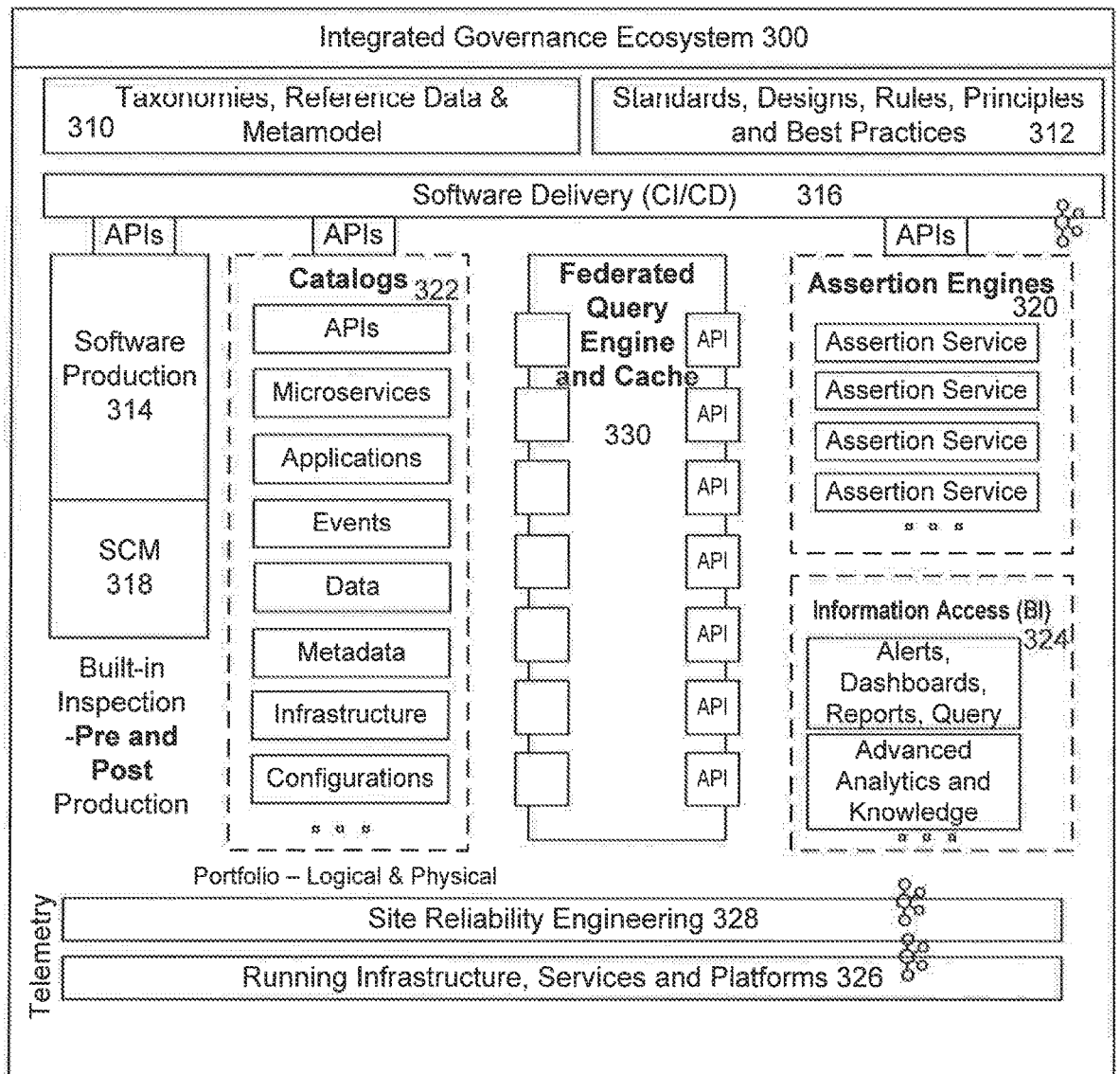
FIG. 3 is an exemplary system diagram of an integrated governance ecosystem, according to an embodiment of the present invention.

FIG. 3 is an exemplary system diagram of an integrated governance ecosystem, according to an embodiment of the present invention. The integrated governance ecosystem may be built-in for visibility and control at scale as represented by 300. An embodiment of the present invention provides a holistic view and enhanced understanding of various services, assets associated with an ecosystem. As shown in FIG. 3, Integrated Governance Ecosystem 300 may manage data and other information, including Taxonomies, Reference Data & Metamodel represented by 310 and Standards, Designs, Rules, Principles and Best Practices represented by 312. Ecosystem 300 may also include Software Delivery (CI/CD) 316 that communicates with various modules and components via APIs. This may include Software Production 314, Source Code Management (SCM) 318, Catalogs 322, Federated Query Engine and Cache 330, Assertion Engines 320 and Information Access (BI) 324. Ecosystem 300 may also support Site Reliability Engineering 328 and Running Infrastructure, Services and Platforms 326.

An embodiment of the present invention is directed to automating Catalogs, represented by 322, as well as automating delivery of micro-services, applications, events, data, metadata. In addition, tags may be applied to automatically build a set of catalogs that define a particular software delivery item where the software delivery may occur automatically and further aligned with rules, taxonomies and other conditions/standards defined by 310, 312.

As shown by 310, Taxonomies, Reference Data and Metamodel represent underpinning meta-model of architecture assets, keys and relationships as well as key taxonomies, reference data and metadata to organize, describe and relate the assets in a business and technical sense.

As shown by 312, Standards, Designs, Rules and Best Practices represent key standards, principles, rules and designs that are turned into policies and/or rules that execute to inspect code and infrastructure events of interest, at build and run time, to ensure software production is in compliance and controlled.

As shown by 314, Software Production represents Infrastructure Products and Services that leverage cloud design principles including templates and provisioning scripts to ensure on-demand orchestration and scaling that is consistent, annotated (e.g., declarative and linked) and inventoried at time of deployment/provisioning to ensure changes to infrastructure and configurations are observable and compliant.

As shown by 316, Software Delivery (CI/CD) represents an automated pipeline of software delivery that requires units of deployment to be submitted to an artifacts repository, including data, for build and deploy governance validation. Software delivery may leverage code style guides that establish declarative and traceable annotations (e.g., markers) that announce the asset and linkage via a build time signature interrogation. Tollgate enforcement may be initiated for noncompliant and non-declarative code at deployment.

As shown by 318, Source Code Management (SCM) represents standards to organize, tag and link application source code via a "visibility-manifest" that declares content under source control and ensures asset linkage, ownership and traceability to units of deployment (e.g., artifacts) are built-in and further automatically inform catalogs and/or inventory as an outcome of deployment. For example, "visibility-manifest" may refer to a configuration file within an application source code structure which holds the lineage information that declares the application or component dependency.

As shown by 320, Assertion Engine (Policy/Rules Enforcement) represents "Standards" converted into rules and purpose fit microservices that are callable as well as integrated into the software delivery, software production and run-time environment to inspect and/or scan for compliance to architecture standards. This automates compliance by design in pre and post production.

As shown by 322, Catalogs represent an evergreen set of logical and physical catalogs that capture and lifecycle manage the key asset inventories and underpinning metadata, enabling an understood, owned and traceable portfolio. Catalog maintenance and accountabilities may be built into software delivery, software production and change/release management and verified with run time discovery telemetry. As shown in FIG. 3, Catalogs may include APIs, Microservices, Applications, Events, Data, Metadata, Infrastructure, Configurations, etc. Other catalogs may be supported. An embodiment of the present invention may bring together various catalogs to provide lineage and dependency views.

As shown by 324, Information Access may provide purpose fit governance dashboards (or other interfaces and communication tools) and query capabilities on history and knowledge graphs to understand portfolio change, maturity and/or compliance. For example, Information Access may include Alerts, Dashboards, Reports, Query Engines as well as Advanced Analytics and Knowledge base.

As shown by 326, Running Infrastructure, Services and Platforms may represent an ability to subscribe to and inspect infrastructure and configuration changes of interest to ensure the governance ecosystem remains evergreen and anomalies are detected and elevated.

As shown by 328, Site Reliability Engineering may represent Pre and Post Deploy Governance that may be informed by rich telemetry, platform visualization, and subscription to events of interest. This enables right-time correlation and governance to standards and designs and further provides observability via agents, proxy telemetry and purpose fit pattern algorithms to continuously monitor and alert for governance events of interest.

As shown by 330, Query Engine and Cache (Governance Analytics) may collect and correlate data sets that support specific and/or cross cutting portfolio analytics by the assertion engines to detect anomalies, business process and technical asset sprawl and portfolio and data optimization opportunities. Analytics may be continuously improved via automated insights using Artificial Intelligence (AI), Machine Learning (ML), etc.

An embodiment of the present invention may be directed to an improved understanding of assets and relationships across those assets at scale. For example, an embodiment of the present invention may identify and understand services as well as relationships and/or interactions between the APIs that they publish, the data they operate on and/or the events are published. An embodiment of the present invention provides an improved understanding of assets, services and data. For example, an embodiment of the present invention may provide details concerning payloads—data in place, data in motion, etc. With the various embodiments of the present invention, results may include improved compliance, enhanced management, better protection of data and privacy, system optimization and efficiencies in resources.

Figure 4:
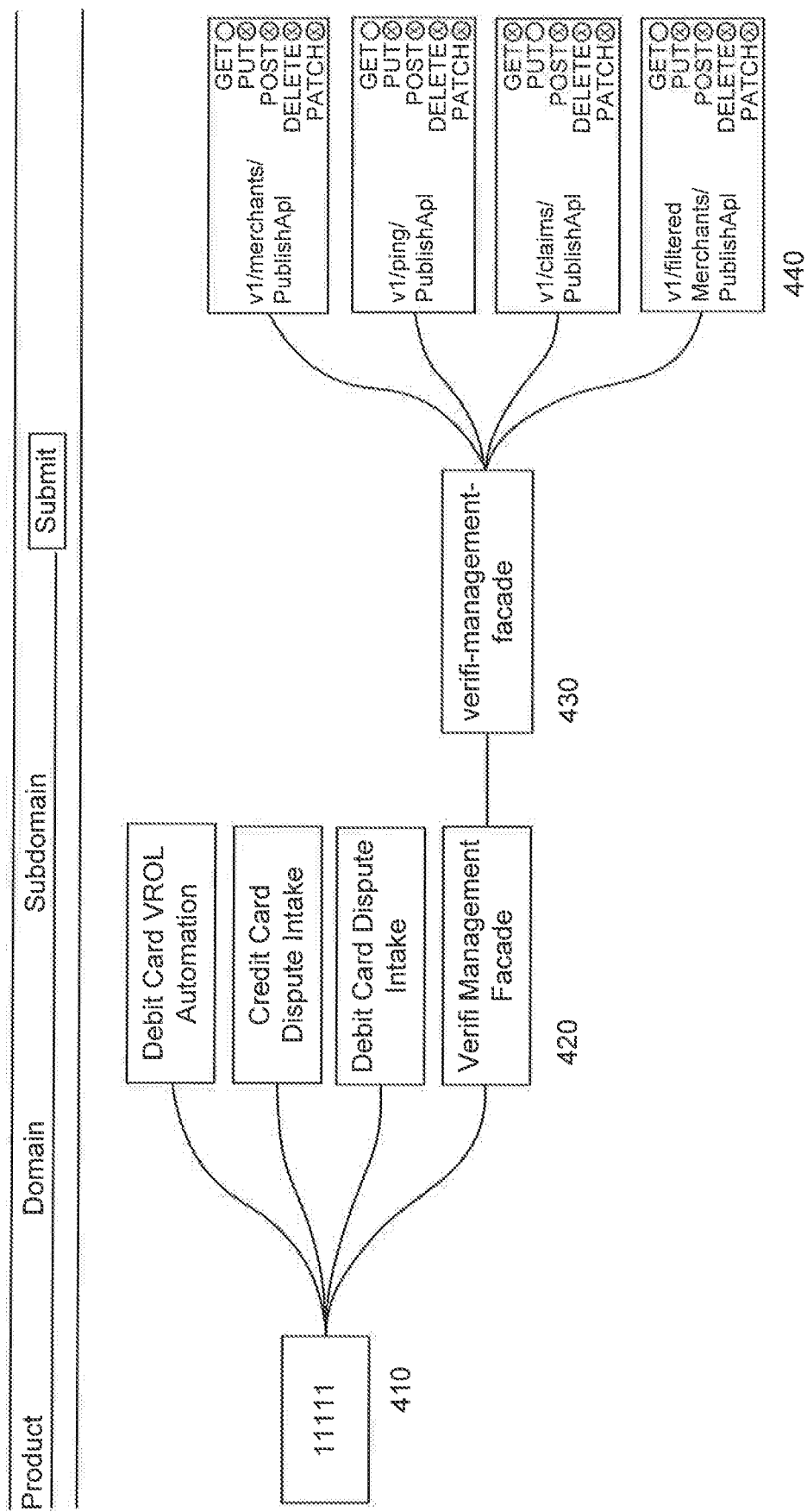
FIG. 4 is an exemplary user interface, according to an embodiment of the present invention.

FIG. 4 is an exemplary user interface, according to an embodiment of the present invention. As shown in FIG. 4, 410 may represent an application or module. In this example, 410 represents a highest node in a taxonomy/hierarchy that represents an application for a given product domain and/or customer Journey. 410 may be identified by an identifier. 420 represents autonomous applications that support the product domain and/or customer journey. For example, a software product may support a Customer Interaction and capabilities required by a well-defined Customer Interaction. The software product may be designed to be isolated, state-aware, and own its own data and further able to change independently of each other, and be deployed by themselves. 430 represents set of microservices that make up an autonomous application. Each microservice implements a capability within an autonomous application and does so with High Cohesion and Low coupling as its core principle. 440 represents a set of API(s) and associated operations (e.g., Read, Read-Write, etc.) that a microservice publishes or subscribes to deliver the capability.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, co-located on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

As described above, a set of instructions is used in the processing of various embodiments of the invention. FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for implementing application lineage metadata and registration, the system comprising:
a memory component that stores and manages code;
an interactive interface that communicates with a user via a communication network; and
a computer processor coupled to the memory component and the interactive interface and further configured to perform the steps of:
initiating a build process for code, wherein the build process comprises one or more plugins integrated with a build tool;
scanning, via one or the one or more plugins, the code for one or more predefined annotation markers that were added into the code;
identifying a corresponding content for each annotation marker;
automatically generating registry information in the form of a plurality of logical and physical catalogs that identify application lineage data associated with one or more assets or services of an ecosystem;
maintaining and storing the registry information in the memory component;
generating analytics based on the registry information; and
providing, via the interactive interface, a search function, filtering, and visualization data that graphically depicts the application lineage data comprising ownership traceability information.

2. The system of claim 1, wherein the build process is initiated by a continuous integration and continuous delivery pipeline.

3. The system of claim 1, wherein the one or more annotation markers comprise a predetermined symbol and one or more of: Publish API, Subscribe API, Publish Event, Subscribe Event, Persistent Database, Application Identifier and Component Identifier.

4. The system of claim 3, wherein the predetermined symbol is not alphanumeric.

5. The system of claim 1, wherein the registry information comprises a catalog with asset inventory and metadata that represents ownership and traceability.

6. The system of claim 5, wherein the catalog comprises one or more of: API catalog, microservices catalog, applications catalog, events catalog, data catalog, metadata catalog, infrastructure catalog and configurations catalog.

7. The system of claim 1, wherein the annotation markers represent a specific implementation pattern that is discovered by an automated discoverability feature.

8. The system of claim 1, wherein the annotation markers are identified by scanning the code to identify a template that represents a specific industry standard.

9. The system of claim 1, wherein the one or more assets or services of an ecosystem comprise Application assets, Events assets, API assets and Data Assets.

10. The system of claim 1, wherein the visualization data is automatically generated and version each time the code is built.

11. A method for implementing application lineage metadata and registration, the method comprising the steps of:
initiating, via a computer processor, a build process for code, wherein the build process comprises one or more plugins integrated with a build tool;
scanning, via one of the one or more plugins, the code for one or more predefined annotation markers that were added into the code;
identifying, via the computer processor, a corresponding content for each annotation marker;
automatically, via the computer processor, generating registry information in the form of a plurality of logical and physical catalogs that identify application lineage data associated with one or more assets or services of an ecosystem;

maintaining and storing, via the computer processor, the registry information in memory component;

generating, via the computer processor, analytics based on the registry information; and providing, via an interactive interface, a search function, filtering, and visualization data that graphically depicts the application lineage data comprising ownership traceability information.

12. The method of claim 11, wherein the build process is initiated by a continuous integration and continuous delivery pipeline.

13. The method of claim 11, wherein the one or more annotation markers comprise a predetermined symbol and one or more of: Publish API, Subscribe API, Publish Event, Subscribe Event, Persistent Database, Application Identifier and Component Identifier.

14. The method of claim 13, wherein the predetermined symbol is not alphanumeric.

15. The method of claim 11, wherein the registry information comprises a catalog with asset inventory and metadata that represents ownership and traceability.

16. The method of claim 15, wherein the catalog comprises one or more of: API catalog, microservices catalog, applications catalog, events catalog, data catalog, metadata catalog, infrastructure catalog and configurations catalog.

17. The method of claim 11, wherein the annotation markers represent a specific implementation pattern that is discovered by an automated discoverability feature.

18. The method of claim 11, wherein the annotation markers are identified by scanning the code to identify a template that represents a specific industry standard.

19. The method of claim 11, wherein the one or more assets or services of an ecosystem comprise Application assets, Events assets, API assets and Data Assets.

20. The method of claim 11, wherein the visualization data is automatically generated and version each time the code is built.

* * * * *